United States Patent
Hawblitzel et al.

(10) Patent No.: US 8,843,908 B2
(45) Date of Patent: Sep. 23, 2014

(54) COMPILER VALIDATION VIA PROGRAM VERIFICATION

(75) Inventors: Chris Hawblitzel, Redmond, WA (US); Shuvendu K. Lahiri, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 409 days.

(21) Appl. No.: 12/977,669

(22) Filed: Dec. 23, 2010

(65) Prior Publication Data

US 2012/0167066 A1   Jun. 28, 2012

(51) Int. Cl.
*G06F 9/45* (2006.01)
*G06F 11/36* (2006.01)

(52) U.S. Cl.
CPC ........ *G06F 11/3624* (2013.01); *G06F 11/3604* (2013.01)
USPC ....................................... 717/146

(58) Field of Classification Search
USPC ....................................... 717/146
See application file for complete search history.

(56) References Cited

U.S. PATENT DOCUMENTS

| | | | |
|---|---|---|---|
| 6,560,774 B1 | 5/2003 | Gordon et al. | |
| 6,704,923 B1 | 3/2004 | Gosling | |
| 8,032,860 B2* | 10/2011 | Piehler et al. | 717/110 |
| 2004/0003380 A1 | 1/2004 | Fedorov | |
| 2008/0189689 A1* | 8/2008 | Tramontana et al. | 717/143 |

OTHER PUBLICATIONS

Wuu Yang et al., "A program integration algorithm that accommodates semantics-preserving transformation", ACM, Transactions of Software Engineering and Methodology, p. 310-354, Jul. 1992.*
Kequiao Yang et al, "Opencj: A research Java static compiler based on Open64", Fudan University, 2009.*
Johnson,"Intermediate Representation", Stanford, 2008.*
Kuster et al., "Validation of Model Transformations . . . " Models 2006 Workshops, 2007, pp. 193-204.*
Barnett et al., "TVOC: A Translation Validator . . .", CAV 2005, 2005, pp. 291-295.*
Venter et al., "SPUR: A Trace-Based JIT Compiler for CIL", Retrieved at << http://research.microsoft.com/pubs/121449/techreport2.pdf >>, Mar. 26, 2010, pp. 17.
Muller et al., "Proof-Transforming Compilation of Eiffel Programs", Retrieved at << http://se.ethz.ch/~meyer/publications/tools/proof-transforming-compilation.pdf >>, 2006, pp. 20.
Leroy, Xavier., "Formal Certification of a Compiler Back-End or Programming a Compiler with a Proof Assistant", Retrieved at << http://moscova.inria.fr/~xleroy/publi/compiler-certif.pdf >>, 2006, pp. 13.

(Continued)

*Primary Examiner* — John Chavis
(74) *Attorney, Agent, or Firm* — Steve Wight; Carole Boelitz; Micky Minhas

(57) ABSTRACT

To overcome the difficulties inherent in traditional compiler validating methods, a new technique is herein provided for validating compiler output via program verification. In one embodiment, this technique is implemented as an automated tool that merges both a source program and the compiler-generated target program into a single (intermediate) program. An automated program verifier is then applied to the merged program. Subsequently, the program verifier compares the source and target programs and determines if the programs are semantically equivalent.

20 Claims, 3 Drawing Sheets

(56) References Cited

OTHER PUBLICATIONS

Muller, et al., "A Program Logic for Bytecode", Retrieved at << http://www.inf.ethz.ch/personal/kroening/classes/251-0276-00/ss2005/papers/BannwartMueller05.pdf >>, 2005, pp. 18.

Bannwart, Yves Fabian., "A Logic for Bytecode and the Translation of Proofs from Sequential Java", Retrieved at << http://sct.ethz.ch/projects/student_docs/Fabian_Bannwart/Fabian_Bannwart_SA_paper.pdf >>, Jun. 2, 2004, pp. 55.

Lee, et al., "The Design and Implementation of a Certifying Compiler", Retrieved at << http://citeseerxist.psu.edu/viewdoc/download?doi=10.1.1.91.3130&rep=rep1&type=pdf >>, 1998, pp. 2.

* cited by examiner

COMPILER VALIDATION VIA PROGRAM VERIFICATION

BACKGROUND

Program compilers are instrumental to the creation and development of software programs. Most computer programs are written according to one of several programming languages which conform to a pre-defined structure and syntax and are legible to software engineers and programmers with knowledge of the specific language. Programs written under a programming language are often referred to as source programs, and generally consist of a formatted collection of statements, instructions and declarations arranged according to the particular syntax of the applicable programming language.

However, source programs written in programming languages are not typically directly executable by a computing device. A program compiler is a computer program (or set of associated programs) that translates a source program to a target program (often having a binary form) directly executable by one or more components of a computing device—such as a processor. Typically, compilers are used to translate source code written in a so-called "high-level" programming language to a target program in a "lower level" language, such as assembly or machine code which can be interpreted and executed by a computer processor.

Unfortunately, compilers may have bugs (programming defects) that may cause the compiler to generate an incorrect target program (i.e., a target program that is not semantically equivalent to the source program). When an incorrect target program runs, it may exhibit incorrect or insecure behavior. This behavior may lead to program faults and can be very difficult to track down and eliminate. Conventional approaches to detecting compiler bugs include continuously compiling multiple test programs, running the test programs, and monitoring the resultant executions. These test programs are often implemented as dedicated programs that are written to test a particular feature or set of features of a programming language. Applications that have been published by software companies may be used as test programs as well.

When a compiler is used to compile a test program, any program faults in the compiler may manifest during compilation or, more frequently, during a subsequent execution of the compiled program. However, some program faults may not manifest at all, may manifest after a delay or intermittently, or may manifest only under certain circumstances and conditions which can appear completely arbitrary and difficult to duplicate. As a result, while running test programs may help determine the presence of a bug in the program code, it is still exceedingly difficult and time consuming to identify the location of the specific problem, or even determine if the problematic code is located in the code of the source program or within the compiler itself.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

To overcome the difficulties inherent in traditional compiler validating methods, a new technique is herein provided for validating compiler output via program verification. In one embodiment, this technique is implemented as an automated tool that merges both a source program and the compiler-generated target program into a single (intermediate) program. An automated program verifier is then applied to the merged program. Subsequently, the program verifier compares the source and target programs and determines if the programs are semantically equivalent.

By applying this technique, the diagnostic capability of compiler verification processes may be improved. For example, if the tool determines that the target program cannot be successfully validated against the source program, the failure appears as a program verification failure (i.e., a compiler failure) rather than an execution failure when the running the target program—thereby simplifying the process of locating the failure in the source and target programs.

According to various embodiments, this tool may also be used to verify program compilers and software programs written with managed programming languages through the additional usage of compiler-generated memory address references for memory management. Correct mapping of memory address references used for data structures created during the execution of a program between the source program and the target program may also be verified as an additional step during the verification process for managed programming language programs.

BRIEF DESCRIPTION OF THE DRAWINGS

The accompanying drawings, which are incorporated in and form a part of this specification, illustrate embodiments of the invention and, together with the description, serve to explain features of the disclosure.

DETAILED DESCRIPTION

Figure 1:
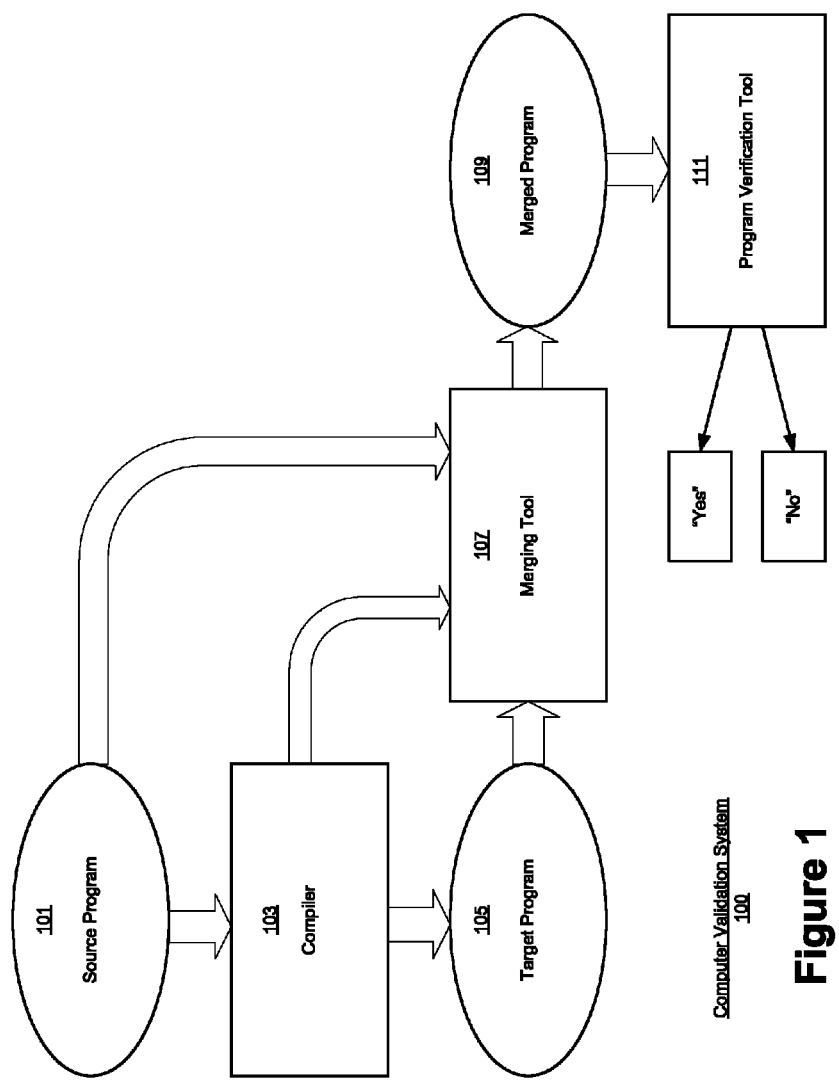
FIG. 1 is an data flow diagram of a typical compiler validation system in accordance with conventional practice.

Reference will now be made in detail to embodiments of the claimed subject matter for validating compilers through program verification, examples of which are illustrated in the accompanying drawings. While the claimed subject matter will be described in conjunction with the disclosed embodiments, it will be understood that they are not intended to be limited to these embodiments. On the contrary, the claimed subject matter is intended to cover alternatives, modifications and equivalents, which may be included within the spirit and scope as defined by the appended claims.

Furthermore, in the following detailed descriptions of embodiments of the claimed subject matter, numerous specific details are set forth in order to provide a thorough understanding of the claimed subject matter. However, it will be recognized by one of ordinary skill in the art that the claimed subject matter may be practiced without these specific details. In other instances, well known methods, procedures, components, and circuits have not been described in detail as not to unnecessarily obscure aspects of the claimed subject matter.

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer generated step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present claimed subject matter, discussions utilizing terms such as "storing," "creating," "protecting," "receiving," "encrypting," "decrypting," "destroying," or the like, refer to the action and processes of a computer system or integrated circuit, or similar electronic computing device, including an embedded system, that manipulates and transforms data represented as physical (electronic) quantities within the computer system's registers and memories into other data similarly represented as physical quantities within the computer system memories or registers or other such information storage, transmission or display devices.

Compiler Validation System

With reference now to FIG. 1, a data flow diagram of an exemplary configuration of a compiler validation system 100 is depicted, in accordance with one embodiment. In one configuration, computer validation system 100 includes a merging tool 107 and a program verification tool 111. In one embodiment, the merging tool 107 receives as input a source program 101 and a target program 105 generated from the source program 101 by a compiler 103. The source program 101 may comprise, for example, a program or other sequence of human-readable "high level" programming language. Conversely, the target program 105 may comprise, for instance, a low-language (e.g., assembly) translation of the source program 101.

According to some embodiments, the merging tool is also configured to accept compiler generated hints from the compiler 103 as an additional input. Compiler generated hints may comprise, in some embodiments, descriptions of how constructs in the high-level program correspond to addresses in the memory of the local (executing) computing device where particular data structures instantiated during an execution of the program may be stored. Alternatively, compiler-generated hints may also include the correspondence between a field name and an integer offset value in a source program, as well as the correspondence between the control flow structure of a high-level program and that of a low-level native program. Usage of compiler generated hints allows for the extension of compiler verification to source programs and compilers developed with managed code. Managed code is the software engineering practice wherein the program application is executed through a runtime environment, rather than the traditional approach of executing the program in a operating platform executing on a computing device.

Essentially, managed code comprises a software layer that the program application communicates with which automates many critical functions. Some of these functions include memory management (garbage collection) and exception handling. Garbage collection is the cleanup and disposal of data objects that are no longer being used by an executing application. Typically, a computer system's random access memory (RAM) is used to store data structures created and used during an execution of a program application. Traditionally, a program application would also include instructions to free up the memory used once the memory was no longer needed (e.g., by deleting the data structure contained in memory). These instructions were traditionally included manually (that is, as part of the programmed code).

In contrast, unmanaged code is compiled directly to machine code and (generally) the post-compilation program can only be run on the machine where it is compiled. Unmanaged code generally does not have automated functionality such as security or memory management from an established runtime environment; instead, unmanaged code programs require that the programmer write many of these common functions that the runtime handles. Essentially, unmanaged code communicates directly with the hardware. Consequently, features such as garbage collection and exception handling need to be written explicitly, whereas managed code allows programmers to focus on functionality of their application while not having to worry about the state of the hardware.

Once the source and target programs are received, the merging tool 107 converts the source program and target program into a common intermediate representation. Finally, the merging tool merges the intermediate representation of the source program and the intermediate representation of the target program into a single intermediate program 109. The single intermediate program is then received as input in a program verification tool 111, where a determination is made whether the original source program is semantically equivalent to the original target program.

Program Validation

Figure 2:
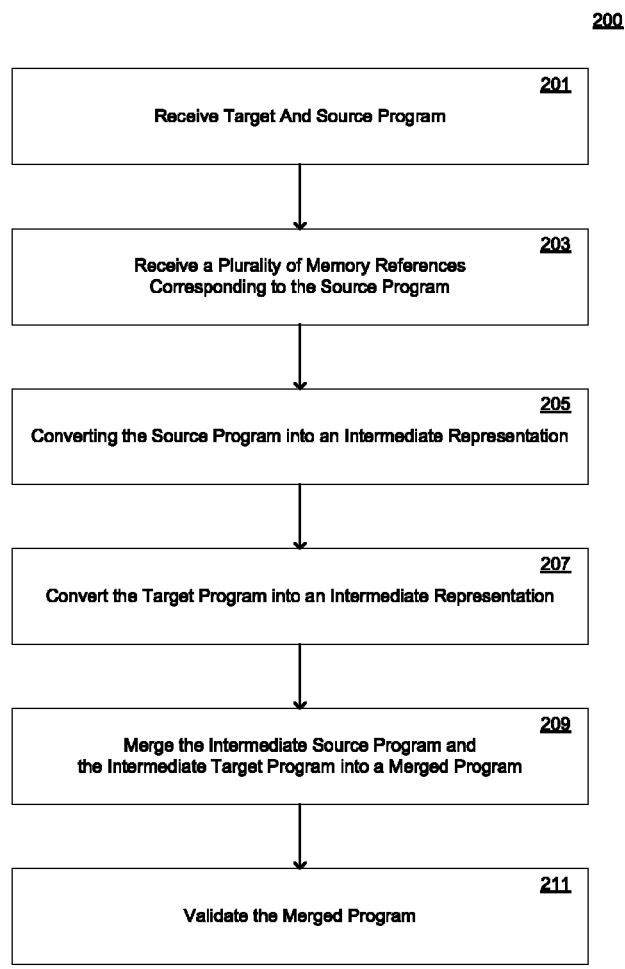
FIG. 2 is a flowchart of a process of compiler validation performed in a typical compiler validation system in accordance with conventional practice.

With reference now to FIG. 2, a flow chart of an exemplary process of a program validation 200 is depicted, in accordance with one embodiment. In one embodiment, the method performs a process for verifying semantic equivalence between a source and target program compiled by a compiler. This process advantageously provides a novel way to validate compilers programs developed with managed languages. Steps 201-211 describe exemplary steps comprising the process depicted in flowchart 200 in accordance with the various embodiments herein described. In one embodiment, the flowchart 200 is implemented as computer-executable instructions stored in a non-transitory computer-readable medium.

At step 201, a source and target program is received. The source program may, for example, comprise a sequence of characters formatted according to a human-readable or "high level" programming language and semantically arranged to perform one or more functions or tasks when executed in a computing device. The target program may comprise, for example, the corresponding sequence of machine-readable bytes generated by compiling the source program in a language-compliant compiler. The source and target programs may be received in a merging tool or module of a compiler validation application, for example. At step 203, a plurality of memory references generated by a compiler during a compilation of the source program is also received in the merging tool or module. These hints may include, for example, a layout of data structures in memory. Additionally, for programs containing functions with loops, the compiler generated hints may also include mappings between the source program state and target program state at the entry to the loops.

To validate managed code compilations, the computer validation system 100 matches the language semantics of the source program to the language semantics of the target program. For example, certain source language programs read and write named fields from data objects, while assembly language programs read and write integer addresses. As the computer validation system 100 converts the source and target programs into an intermediate language at steps 205 and 207, respectively, the computer validation system 100 performs a semantic translation as well as a syntactic translation, so that both the source intermediate language code and target intermediate language code have matching semantics.

For example, conversion may include translating source-language field names into integer offsets, based on compiler hints about data structure layout. As another example, the conversion may include translating the data pair of an object reference register and an integer offset contained in a target program to determine the value of a corresponding data field in the source program. As another example, procedure calls in the source program may be translated into uninterpreted functions that generate return values and transform portions of memory. In one embodiment, a mapping from each procedure's address to the procedure's uninterpreted function is generated; this mapping allows the merging tool to track, monitor, and manage dynamically-bound procedure calls, such as virtual calls.

At step 209, the intermediate representations of the source and target programs are merged into a single merged program. According to some embodiments, the merging process is performed on a procedure-by-procedure basis. For each procedure, a procedure in the intermediate representation of the source program and the corresponding procedure in the intermediate representation of the target program is merged into a single procedure of the programming language of the intermediate representation. This merging may be performed using semantic differentiator tools. In one embodiment, the intermediate representations of the source and target programs are parsed to derive all of the logical expressions (e.g., equations, formulas) contained in the program. The logical expressions are subsequently verified for consistency and accuracy throughout the entire program, and between the source and target programs.

Alternatively, the merging may be performed directly within the computer validation system 100. In one embodiment, the merging may be performed within the computer validation system 100 by parsing the procedures into loop-free sections of code. For each loop-free section, the merging tool generates an invariant based either on calling conventions or on supplied compiler hints. This invariant describes the mapping between the source state and target state. After the invariant is generated, the merging tool transcribes in the loop-free section of the source representation, followed by the loop-free section of the target representation. Subsequently, the merging tool pastes in an assertion that both the source section and target section compute the decision about which section to go to next. At the end of the merging procedure, the tool validates the merged program at step 211 by determining whether the source and target states match (same memory state, same return value). A successful validation may be expressed affirmatively, with an unsuccessful validation being expressed negatively. In further embodiments, the specific disparities between the intermediate representations of the source and target programs may be identified during the merging process and, in the event of an unsuccessful validation, may be output to the user.

Example Computing Device

Figure 3:
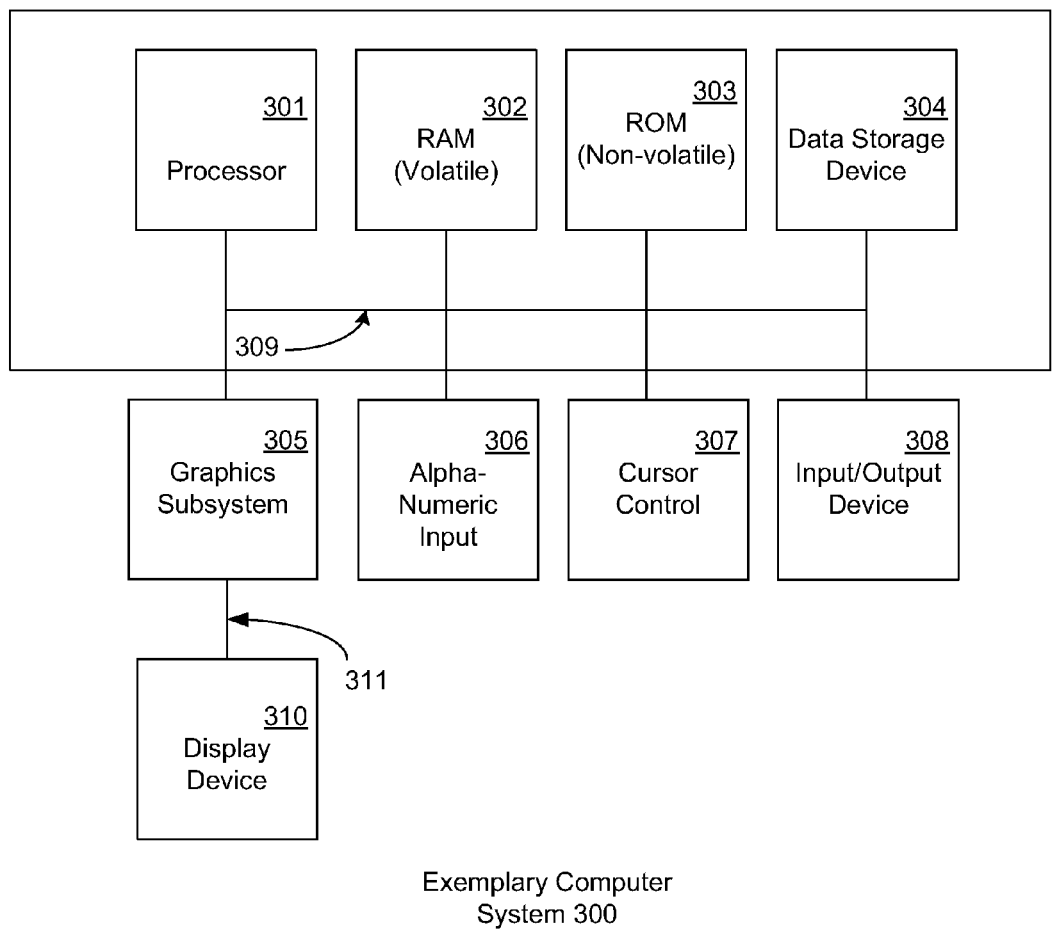
FIG. 3 is an illustration of an exemplary computing system in accordance with various embodiments of the claimed subject matter.

As presented in FIG. 3, a system upon which embodiments of the present invention may be implemented includes a general purpose computing system environment, such as computing system 300. In its most basic configuration, computing system 300 typically includes at least one processing unit 301 and memory, and an address/data bus 309 (or other interface) for communicating information. Depending on the exact configuration and type of computing system environment, memory may be volatile (such as RAM 302), non-volatile (such as ROM 303, flash memory, etc.) or some combination of the two.

Computer system 300 may also comprise an optional graphics subsystem 305 for presenting information to the computer user, e.g., by displaying information on an attached display device 310, connected by a video cable 311. According to embodiments of the present claimed invention, the graphics subsystem 305 may be coupled directly to the display device 310 through the video cable 311. A graphical user interface of the compiler validation system 100 may be generated in the graphics subsystem 305, for example, and displayed to the user in the display device 310. In alternate embodiments, display device 310 may be integrated into the computing system (e.g., a laptop or netbook display panel) and will not require a video cable 311. In one embodiment, the process 200 may be performed, in whole or in part, by graphics subsystem 305 in conjunction with the processor 301 and memory 302, with any resulting output (e.g., successful/unsuccessful compiler validation) displayed in attached display device 310.

Additionally, computing system 300 may also have additional features/functionality. For example, computing system 300 may also include additional storage (removable and/or non-removable) including, but not limited to, magnetic or optical disks or tape. Such additional storage is illustrated in FIG. 3 by data storage device 304. Computer storage media includes volatile and nonvolatile, removable and non-removable media implemented in any method or technology for storage of information such as computer readable instructions, data structures, program modules or other data. RAM 302, ROM 303, and data storage device 304 are all examples of computer storage media.

Computer system 300 also comprises an optional alphanumeric input device 306, an optional cursor control or directing device 307, and one or more signal communication interfaces (input/output devices, e.g., a network interface card) 308. Optional alphanumeric input device 306 can communicate information and command selections to central processor 301. Optional cursor control or directing device 307 is coupled to bus 309 for communicating user input information and command selections to central processor 301. Signal communication interface (input/output device) 308, also coupled to bus 309, can be a serial port. Communication interface 308 may also include wireless communication mechanisms. Using communication interface 308, computer system 300 can be communicatively coupled to other computer systems over a communication network such as, for example, the Internet or an intranet (e.g., a local area network), or can receive data (e.g., a digital television signal).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for verifying a compiler comprising:
receiving a plurality of programs, the plurality of programs comprising at least a source program and a target program corresponding to the source program;

receiving a plurality of compiler-generated hints corresponding to the source program;

converting the source program into an intermediate representation of the source program;

converting the target program into an intermediate representation of the target program, the converting the source program and the converting the target program including performing a semantic translation and a syntactic translation on the source program and the target program to cause the intermediate representation of the source program and the intermediate representation of the target program to have matching semantics;

merging the intermediate representation of the source program and the intermediate representation of the target program into a single merged program by merging one or more procedures in the intermediate representation of the source program with one or more corresponding procedures in the intermediate representation of the target program to form one or more single procedures in the single merged program; and validating the merged program.

2. The method according to claim 1 wherein the source program comprises a managed language program.

3. The method according to claim 2 wherein the source program comprises a sequence of uncompiled object-oriented programming code.

4. The method according to claim 3 wherein the target program comprises a sequence of compiled programming code generated by the compiler from compiling the source program.

5. The method according to claim 3, wherein the object-oriented programming code comprises a plurality of dynamically-bound procedure calls.

6. The method according to claim 5, wherein the plurality of dynamically-bound procedure calls comprises a plurality of virtual calls.

7. The method according to claim 1 wherein the plurality of compiler-generated hints corresponding to the source program comprises a plurality of memory address reference descriptions.

8. The method according to claim 1 wherein the plurality of compiler-generated hints comprises the layout of data structures in memory used by the merged program during an execution of the merged program.

9. The method according to claim 8 wherein the plurality of programs comprises a plurality of programmed loops, and wherein the plurality of compiler-generated hints comprises a plurality of mappings between a state of the source program and a state of the target program during an execution of the plurality of programmed loops.

10. The method according to claim 9 wherein converting the source program further comprises parsing the source program to derive a plurality of logical expressions comprised in the source program, and wherein converting the target program comprises parsing the target program to derive a plurality of logical expressions comprised in the target program.

11. The method according to claim 10 wherein validating the merged program comprises verifying a consistency of the plurality of logical expressions comprised in the target program and the plurality of logical expressions comprised in the source program.

12. A computer storage memory comprising program instructions stored thereon that, responsive to execution in a computing device, perform operations comprising:

receiving a plurality of programs, the plurality of programs comprising at least a source program and a target program corresponding to the source program;

receiving a plurality of compiler-generated hints corresponding to the source program;

converting the source program into an intermediate representation of the source program;

converting the target program into an intermediate representation of the target program;

merging the intermediate representation of the source program and the intermediate representation of the target program into a merged program by merging procedures in the intermediate representation of the source program with corresponding procedures in the intermediate representation of the target program to form single procedures in the merged program; and validating the merged program.

13. The computer storage memory according to claim 12 wherein the converting the source program further comprises parsing the source program to derive a plurality of logical expressions comprised in the source program.

14. The computer storage memory according to claim 13 wherein the converting the target program further comprises parsing the target program to derive a plurality of logical expressions comprised in the target program.

15. The computer storage memory according to claim 14 wherein the validating the merged program further comprises verifying a consistency of the plurality of logical expressions comprised in the target program and the plurality of logical expressions comprised in the source program.

16. A system for validating a compiler, the system comprising:

a merging tool configured to merge an uncompiled source program and a target program comprising a compiled representation of the uncompiled source program into a merged intermediate program comprising a plurality of logical expressions by merging procedures in the intermediate representation of the source program with corresponding procedures in the intermediate representation of the target program to form single procedures in the merged program; and a verification tool configured to verify a consistency of the plurality of logical expressions from the merged intermediate program, the source program comprising a managed language source program.

17. The computer storage memory according to claim 12 wherein the source program comprises a managed language program.

18. The computer storage memory according to claim 17, wherein the object-oriented programming code comprises a plurality of dynamically-bound procedure calls.

19. The computer storage memory according to claim 12 wherein the source program comprises a sequence of uncompiled object-oriented programming code.

20. The computer storage memory according to claim 12 wherein the target program comprises a sequence of compiled programming code generated by the compiler from compiling the source program.

* * * * *